United States Patent
Pandey et al.

(10) Patent No.: US 12,289,569 B1
(45) Date of Patent: Apr. 29, 2025

(54) TIME-DIVISION MULTIPLEXED SYSTEMS AND METHODS FOR REDUCING OVERESTIMATION OF BANDWIDTH DEMAND

(71) Applicant: ADTRAN, Inc., Huntsville, AL (US)

(72) Inventors: Sanjai Kumar Pandey, Madison, AL (US); Richard L. Goodson, Huntsville, AL (US); Bruce E. Mitchell, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 18/055,254

(22) Filed: Nov. 14, 2022

(51) Int. Cl.
*H04J 14/00* (2006.01)
*H04Q 11/00* (2006.01)

(52) U.S. Cl.
CPC . *H04Q 11/0067* (2013.01); *H04Q 2011/0086* (2013.01); *H04Q 2213/13292* (2013.01)

(58) Field of Classification Search
CPC .... H04B 10/27; H04B 10/40; H04B 10/0795; H04B 10/272; H04Q 11/0067; H04J 14/0245; H04J 14/0247; H04J 14/0249; H04J 14/0216; H04J 14/0246; H04L 47/22; H04L 47/50; H04L 47/626; H04L 47/12
USPC ........ 398/66, 67, 68, 69, 70, 71, 72, 79, 75, 398/76, 33, 38, 25, 26, 27, 135, 136, 158, 398/159, 98, 99, 100, 58, 59, 45, 48, 49; 370/352, 392, 468, 389, 395.43
See application file for complete search history.

(56) References Cited

U.S. PATENT DOCUMENTS

| | | | |
|---|---|---|---|
| 9,729,241 B2 | 8/2017 | Goodson et al. | |
| 9,819,599 B2* | 11/2017 | Jin | H04L 41/0896 |
| 2007/0122151 A1* | 5/2007 | Watanabe | H04J 3/1694 |
| | | | 398/69 |
| 2007/0133989 A1 | 6/2007 | Kim et al. | |
| 2013/0251371 A1 | 9/2013 | Goodson | |
| 2015/0350083 A1* | 12/2015 | Goodson | H04L 43/026 |
| | | | 370/236 |
| 2019/0394135 A1* | 12/2019 | Hisano | H04L 12/44 |

* cited by examiner

*Primary Examiner* — Hanh Phan
(74) *Attorney, Agent, or Firm* — Butler Snow LLP; Jon E. Holland

(57) ABSTRACT

A time-division multiplexed (TDM) communication system has a dynamic bandwidth allocation (DBA) controller that is configured to reduce demand overestimation so that more optimal bandwidth allocation is achieved. Upon receiving load information from a transceiver, the DBA controller is configured to estimate an amount of change to the transceiver's reported load based on previous allocations of bandwidth to the transceiver for frames that occur during a reporting delay (e.g., the delay from the time that the load information is transmitted until it is received and processed). That is, the estimated load is reduced in an effort to account for transmissions made by the transceiver during the reporting delay, thereby preventing or reducing the amount of demand overestimation that would otherwise occur. Thus, the transceiver may be allocated less bandwidth according to a desired DBA algorithm so that more network bandwidth is available for other transceivers.

16 Claims, 4 Drawing Sheets

TIME-DIVISION MULTIPLEXED SYSTEMS AND METHODS FOR REDUCING OVERESTIMATION OF BANDWIDTH DEMAND

RELATED ART

In a passive optical network (PON), an optical line terminal (OLT) is coupled to a plurality of optical network units (ONUs) by optical fibers. In the downstream direction, each ONU receives the transmissions of the OLT. In the upstream direction, communication is often time-division multiplexed, where each ONU is assigned timeslots for upstream communication. For each upstream timeslot, only one ONU is permitted to transmit in order to avoid data collisions.

Generally, timeslot assignment is controlled by a dynamic bandwidth allocation (DBA) controller that is usually located at the OLT. The DBA controller receives load information from each ONU indicating the respective ONU's upstream load conditions (e.g., how much data the ONU is currently buffering for transmission to the OLT). Based on the load information from all of the ONUs and the available network capacity, the DBA controller fairly allocates bandwidth to the ONUs according to a desired DBA algorithm. To improve network performance, it is desirable to optimize this bandwidth allocation so that network capacity is not needlessly wasted.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to time-division multiplexed (TDM) systems and methods for reducing overestimation of bandwidth demand. In implementing a DBA algorithm, overestimation of bandwidth demand generally refers to a condition when a transceiver's load (e.g., amount of data to transmit) is over estimated, which can result in the transceiver being allocated more bandwidth than what is needed or desired for the amount of data the transceiver actually has buffered for transmission. Ultimately, demand overestimation results in a waste of network bandwidth that otherwise could be allocated to other transceivers in order to improve overall network performance, and it is generally desirable to minimize or otherwise reduce occurrences of demand overestimation.

There are several factors that can cause overestimation of bandwidth demand to occur. In some cases, overestimation can result from delays in the communication of control information over the network. As an example, in a passive optical network (PON) system for which an optical line terminal (OLT) is in communication with a plurality of ONUs, each ONU is typically configured to transmit upstream load information indicating the amount of data it currently has queued for transmission to the OLT. There is a delay, referred to herein as "reporting delay," between the time that the ONU transmits its upstream load information and the time that such load information is received by the OLT and processed for allocating upstream bandwidth. Generally, the further that the ONU is from the OLT, the longer is this reporting delay. By the time the OLT receives upstream load information from the ONU, the upstream load at the ONU has typically changed due at least in part to upstream transmissions of data from the ONU during the reporting delay.

In some embodiments of the present disclosure, upon receiving upstream load information from an ONU, a dynamic bandwidth allocation (DBA) controller is configured to estimate an amount of change to the reported load based on previous allocations of bandwidth to the ONU for frames communicated during the reporting delay. That is, the estimated load at the ONU is reduced in an effort to account for upstream transmissions made by the ONU during the reporting delay (e.g., while the load information is propagating through the PON to the OLT), thereby preventing or reducing the amount of demand overestimation that would otherwise occur as a result of the reporting delay. Thus, the ONU may be allocated less bandwidth according to a desired DBA algorithm so that more bandwidth is available for other ONUs of the PON.

Figure 1:
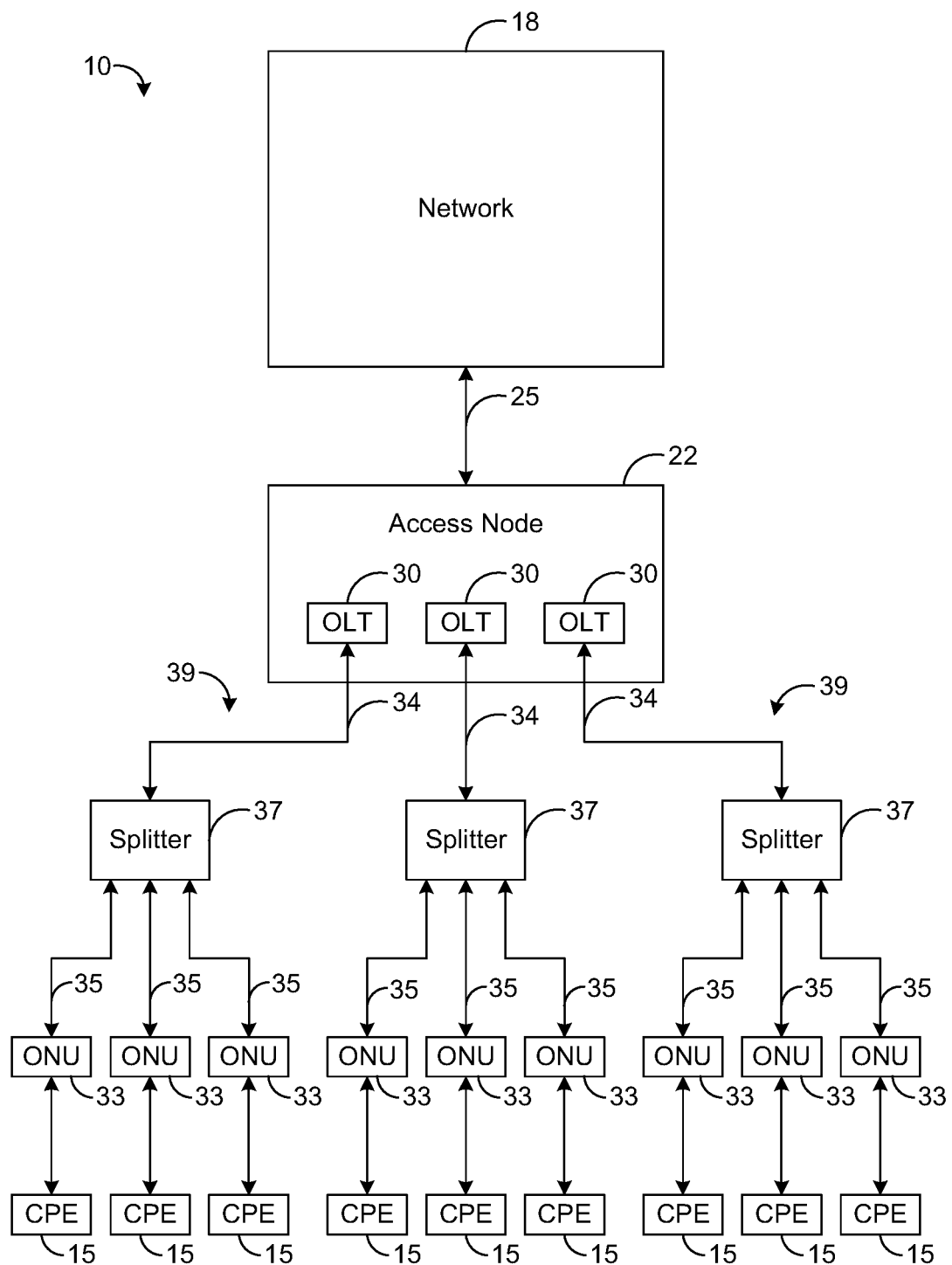
FIG. 1 is a block diagram illustrating an exemplary embodiment of a communication system.

FIG. 1 depicts an exemplary embodiment of a communication system 10 for communicating data between a network 18 and customer premises equipment (CPE) 15 at a plurality of customer premises (CP). The network 18 can comprise any of various types of networks, such as the public switched telephone network (PSTN), wide area networks (WANs), cellular networks, or the Internet. As shown by FIG. 1, the network 18 is coupled to an access node 22 via a network connection 25. In one exemplary embodiment, the network connection 25 comprises an optical fiber, but other types and numbers of network connections may be used for communication between the access node 22 and the network 18.

In the downstream direction, the access node 22 is configured to demultiplex a data stream received from the connection 25, thereby separating the data stream into a plurality of demultiplexed packet flows where each packet flow includes packets for a respective service. In this regard, customers subscribe for services, such as Internet service, telephone service, and television service, and each downstream packet flow within the access node 22 generally corresponds to and defines downstream data for a respective service for a respective customer. The packet flows are switched within the access node 22 such that each packet flow is forwarded to its respective destination CPE 15.

As shown by FIG. 1, the access node 22 has a plurality of optical line terminals (OLTs) 30 having optical transceivers for communicating optical signals. In other embodiments other types of transceivers are possible, including transceivers for communicating electrical signals, such as digital subscriber line (DSL) transceivers.

Each OLT 30 is coupled to a respective set of optical network units (ONUs) 33 via a plurality of communication connections 34, 35, which in the embodiment shown by FIG. 1 are optical fibers that define an optical channel between the OLT 30 and each of the ONUs 33. Each optical fiber 34 is coupled to a respective optical splitter 37 that splits downstream signals from the access node 22 across a plurality of optical fibers 35. Each ONU 33 is configured to receive at least one packet flow from the access node 22 and to convert the received packet flows from the optical domain to the electrical domain. Each OLT 30 and the optical components coupled to it, including the optical splitter 37, ONUs 33, and optical fibers 34, 35 form a passive optical network (PON) 39 for communicating the packet flows via optical signals. In other embodiments, other types of optical channels and non-optical channels may be used to communicate the packet flows between the access node 22 and the CPE 15.

Note that FIG. 1 shows three PONs 39 for simplicity of illustration. However, there may be any number of PONs 39 on an access node 22, and each PON 39 may have any number of optical components, such as ONUs 33. Indeed, the access node 22 may have several access modules (not shown in FIG. 1), and any access module may be coupled to and service several PONs 39, each of which may service several ONUs. In addition, as will be described in more detail hereafter, data may be transmitted in the upstream direction. In general, data is communicated across a given PON 39 in frames, where each frame typically includes both downstream timeslots for transmitting data (e.g., one or more packets downstream), and upstream timeslots for transmitting data (e.g., one or more packets) upstream. As will be described in more detail below, at least some of the upstream timeslots may include control information, such as load conditions at the ONUs 33, and at least some of the downstream timeslots may include control information (e.g., a bandwidth map) that allocates bandwidth for upstream data transmissions.

Figure 2:
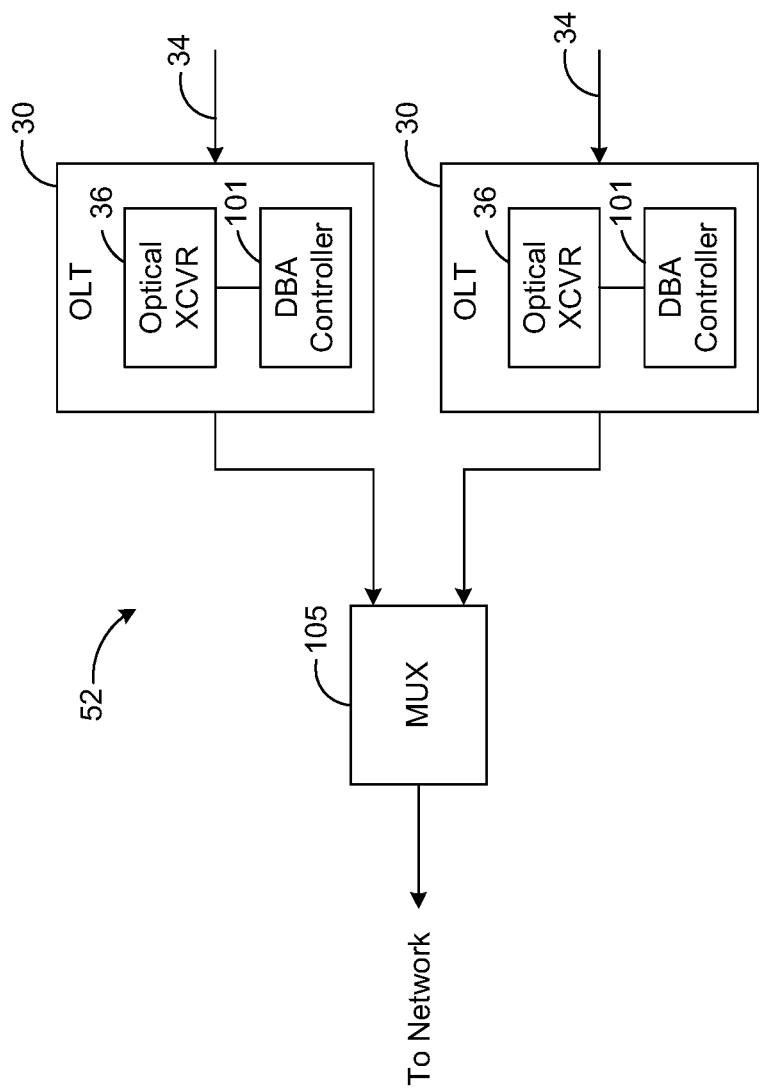
FIG. 2 is a block diagram illustrating an exemplary embodiment of an access module of an access node, such as depicted by FIG. 1, configured for upstream communication.

FIG. 2 depicts an exemplary embodiment of an access module 52 of the access node 22 on which a pair of the OLTs 30 shown by FIG. 1 are mounted, noting that an access module 52 may have any number of OLTs 30 in other embodiments. As shown by FIG. 2, each OLT 30 is coupled to a multiplexer (MUX) 105. When upstream packets are received by an OLT 30 from an optical fiber 34, an optical transceiver (XCVR) 36 of the OLT 30 converts the packets from the optical domain to the electrical domain and transmits the converted packets to the multiplexer 105, which multiplexes the data streams from multiple OLTs 30 to form a combined data stream for transmission to the network 18 (FIG. 1). In one exemplary embodiment where the network connection 25 is an optical fiber, other components (not specifically shown) of the access node 22 may convert the packets from the multiplexer 105 from the electrical domain to the optical domain for transmission to the network 18.

As shown by FIG. 2, each OLT 30 has a dynamic bandwidth allocation (DBA) controller 101 that is coupled to the OLT's transceiver 36 and configured to control bandwidth allocation for the PON 39 serviced by the transceiver 36. In one exemplary embodiment, the DBA controller 101 is implemented in hardware, such as a field programmable gate array (FPGA). In other embodiments, the DBA controller 101 may include one or more processors (e.g., microprocessors or digital signal processors (DSPs)) that are programmed with and execute software for performing the functions ascribed to the DBA controller 101 herein.

As will be described in more detail below, each DBA controller 101 is configured to communicate with the optical transceiver 36 of its respective OLT 30 in order to control upstream bandwidth allocation, such as by controlling the data rates that the ONUs 33 (FIG. 1) are permitted to transmit upstream. In this regard, via known techniques, the DBA controller 101 of an OLT 30 is configured to provide control information for controlling (e.g., assigning timeslots to respective ONUs 33), the OLT's transceiver 36 is configured to communicate such control information with the ONUs 33 (FIG. 1) of the same PON 39 via a control channel. For example, the control information may include timeslot allocations that indicate when each ONU 33 is permitted to transmit upstream, how much bandwidth is allocated to each ONU 33, and/or other suitable control information. As will be described in more detail hereafter, the DBA controller 101 may be configured to determine upstream bandwidth allocation for each ONU 33 based on a variety of parameters, such as a maximum provisioned upstream bandwidth for the ONU 33 (i.e., the sum of the maximum upstream bandwidth that is provisioned for each of the services of the ONU 33), an amount of requested bandwidth of the ONU 33 and other ONUs 33, an actual bandwidth usage of the ONU 33 and other ONUs 33, scaling factors, and other suitable parameters. Control information is generated based on the allocated upstream bandwidth, and each respective OLT 30 transmits the control information to the ONUs 33 in the same PON 39 such that the packet flows sent by the ONUs 33 are at the appropriate rates to implement the desired upstream bandwidth allocation.

For a given PON 39, the PON's OLT 30 may communicate with the ONUs 33 via a control channel of the PON 39 or otherwise in order to learn the traffic load conditions (e.g., amount of data buffered for upstream transmission) at each ONU 33. Based on such load conditions, the DBA controller 101 fairly allocates the upstream bandwidth to each ONU 33 of the PON 39 according to a desired DBA algorithm depending on various factors, as described above. As an example, the DBA controller 101 may allocate bandwidth to a given ONU 33 based on its reported load conditions such that the ONU's load is forced to 0 or greater depending on various factors, such as limits on data rates, latencies, and other parameters required by applicable service level agreements. The allocation is indicated by the control information that is provided by the OLT 30 to the ONUs 33 so that each ONU 33 may transmit in the upstream timeslots allocated to it. As an example, the control information may include a bandwidth map that respectively assigns certain timeslots of a frame to each ONU 33 consistent with the bandwidth allocation determined by the DBA controller 101. Each ONU 33 may thereafter use the timeslots assigned to it in order to transmit data upstream to the OLT 30. Notably, each upstream timeslot is assigned to only one ONU 33 in order to prevent data collisions on the PON 39.

Figure 3:
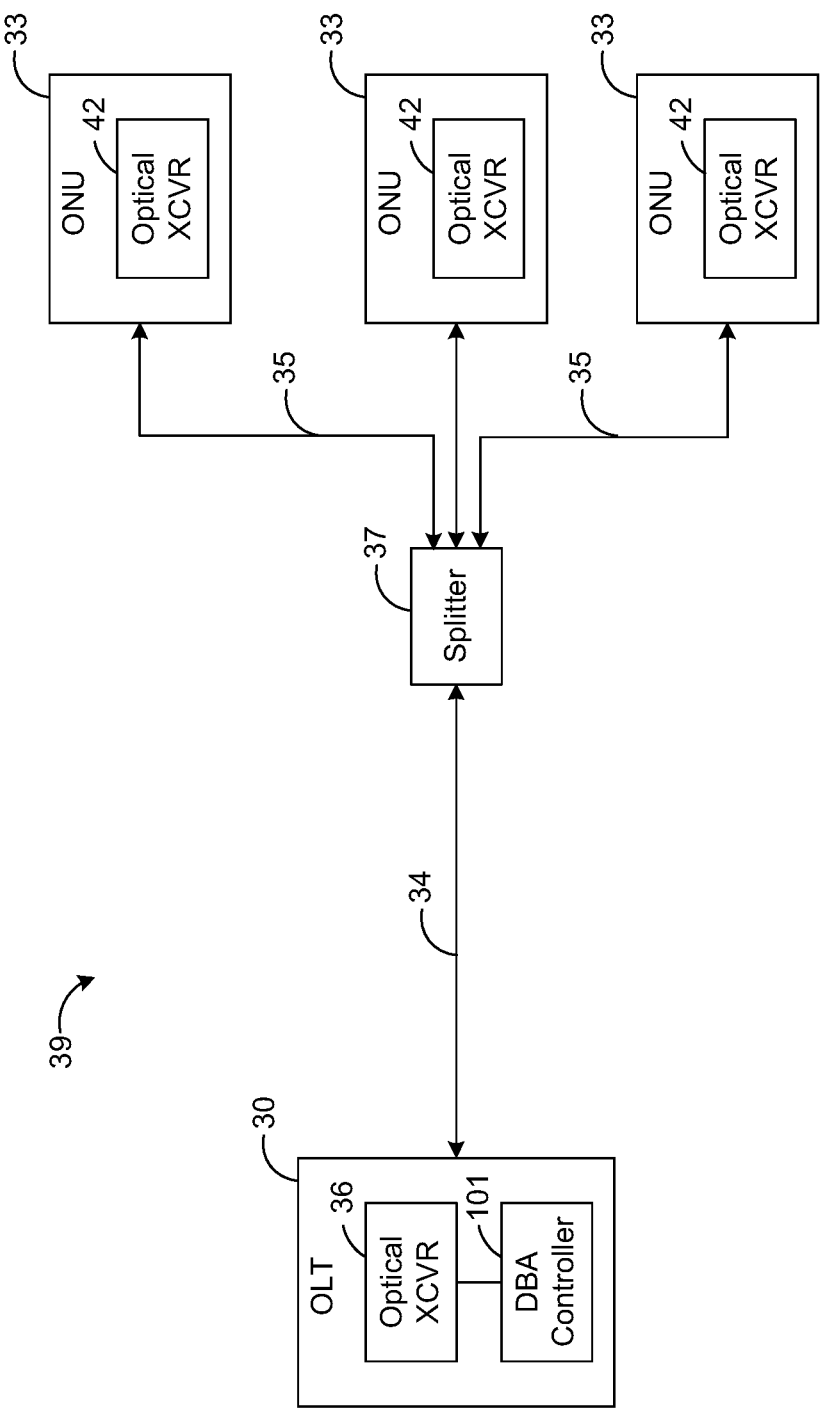
FIG. 3 is a block diagram illustrating an exemplary embodiment of a passive optical network, such as is depicted by FIG. 1.

FIG. 3 depicts an exemplary embodiment of PON 39. As shown by FIG. 3, each ONU 33 has an optical transceiver 42 that is coupled to and communicates with the optical transceiver 36 of the PON's OLT 30. In this regard, as noted above, the optical protocol of the PON 39 may define a control channel that permits control information to be exchanged between the transceivers 36 and 42 in between data transmissions for certain frames. In other embodiments, control information may be communicated between the OLT 30 and ONUs 33 via other techniques.

As noted above, there is a delay (referred to herein as "reporting delay") between the time that an ONU 33 transmits its current upstream load information (which indicates the ONU's current bandwidth demand) and the time that such load information is received by the OLT 30 and processed by the DBA controller 101. During this reporting delay, the ONU 33 may transmit upstream data in several frames such that the upstream load at the ONU 33 has been reduced by the time that the OLT 30 receives the previously transmitted load information. In such circumstance, the ONU's bandwidth demand is overestimated (e.g., indicated to be greater than it actually is) such that more bandwidth may be allocated to the ONU 33 by the DBA controller 101 than what it is desired or fair according to the DBA algorithm.

In an effort to prevent or reduce the effects of overestimation of bandwidth demand, the DBA controller 101 is configured to account for the effect of previous bandwidth allocations to the ONU 33 during the reporting delay. Specifically, the DBA controller 101 is configured to reduce the reported upstream load based on the amount of bandwidth allocated to the ONU 33 for the frames in which the ONU 33 transmits data during the reporting delay. By reducing the upstream load reported by the ONU 33, less bandwidth may be allocated to the ONU 33, thereby conserving bandwidth for use by other ONUs. 33.

As an example, assume that an OLT 30 receives load information from an ONU 33, and the DBA controller 101 uses such load information to allocate bandwidth to the ONU 33 for a particular frame (n). Further assume that there is a five-frame delay between the time that the ONU 33 transmits the load information and the time that the OLT 30 receives the load information and the DBA controller 101 uses the load information to allocate bandwidth for frame (n). In other words, after the load information is transmitted by the ONU 33 in frame (n-6), the ONU 33 transmits data in five additional frames (n-5), (n-4), (n-3), (n-2), and (n-1) before the load information in frame (n-6) is processed by the DBA controller 101. Note that the five-frame delay described above is exemplary, and in other embodiments, other amounts of delay are possible.

In some embodiments, the DBA controller 101 may be configured to reduce the load indicated by the load information from the ONU 33 by the amount of bandwidth allocated to the ONU 33 for each of the five frames that occur during the reporting delay. For example, if $L_{n-6}$ represents the load (e.g., amount of data queued for upstream transmission) reported by the ONU 33 in frame (n-6), the adjusted load (L') calculated by the DBA controller 101 for the ONU 33 may be expressed by the following equation:

$$L' = L_{n-6} - (A_{n-1} + A_{n-2} + A_{n-3} + A_{n-4} + A_{n-5}) \qquad (1)$$

where $A_{n-1}$ is the bandwidth allocated to the ONU 33 (e.g., maximum amount of data authorized for upstream transmission by the ONU 33) for the frame (n-1) immediately preceding frame (n), $A_{n-2}$ is the bandwidth allocated to the ONU 33 for the frame (n-2) immediately preceding frame (n-1), $A_{n-3}$ is the bandwidth allocated to the ONU 33 for the frame (n-3) immediately preceding frame (n-2), $A_{n-4}$ is the bandwidth allocated to the ONU 33 for the frame (n-4) immediately preceding frame (n-3), and $A_{n-5}$ is the bandwidth allocated to the ONU 33 for the frame (n-5) immediately preceding frame (n-4). Thus, the adjusted load L' used to allocate bandwidth for frame (n) is reduced relative to the reported load $L_{n-6}$ such that less bandwidth is allocated to the ONU 33 for frame (n), thereby conserving bandwidth that may be allocated to other ONUs 33 of the PON 39. For example, the DBA controller 101 may allocate bandwidth to a given ONU 33 based on L' such that the ONU's load is forced to 0 or greater depending on various factors, such as limits on data rates, latencies, and other parameters required by applicable service level agreements. Since the DBA controller 101 accounts for the bandwidth allocated to the ONU 33 during the reporting delay, the adjusted load L' should better indicate the actual load that the ONU 33 has at the time of occurrence of frame (n) such that overestimation is less likely to occur or is less pronounced.

In some embodiments, the DBA controller 101 may be configured to reduce the reported load by an amount less than the total bandwidth allocated to the ONU 33 during the reporting delay. As an example, scaling factors may be applied to the reported load and/or the allocated bandwidth to control how quickly the buffered load at the ONU 33 is transmitted upstream, thereby controlling an amount that demand overestimation is allowed to occur. For example, the adjusted load L' may be calculated according to the following equation:

$$L' = a*L_{n-6} - b*(A_{n-1} + A_{n-2} + A_{n-3} + A_{n-4} + A_{n-5}) \qquad (2)$$

where a and b are scaling factors. In this regard, each value a and b may be a constant selected to have a value between 0 and 1. As an example, the values a and b may be provisioned at the time of installation of the PON 39 depending on various factors, such as the configuration of the PON 39 and the distances between the OLT 30 and ONUs 33. When a=1 and b=1, true upstream load is calculated. In this regard, the reported upstream load is adjusted to fully account for the bandwidth that is allocated to the ONU 33 during the reporting delay such that L' should represent the actual load buffered in the ONU 33 at the time of frame (n). When 0<a<1 and 0<b<1, packet latency is increased such that it may take longer to drain the upstream buffer at the ONU 33 relative to an embodiment where true upstream load is calculated. Generally, packet latency is increased to a greater extent for smaller values of a and b (i.e., as a and b approach closer to 0). When a=1 and 0<b<1, demand overestimation is allowed (albeit reduced relative to an embodiment that makes no adjustment to the reported load), and over allocation may occur in order to drain the buffer at the ONU 33 quicker, thereby reducing packet latency.

Figure 4:
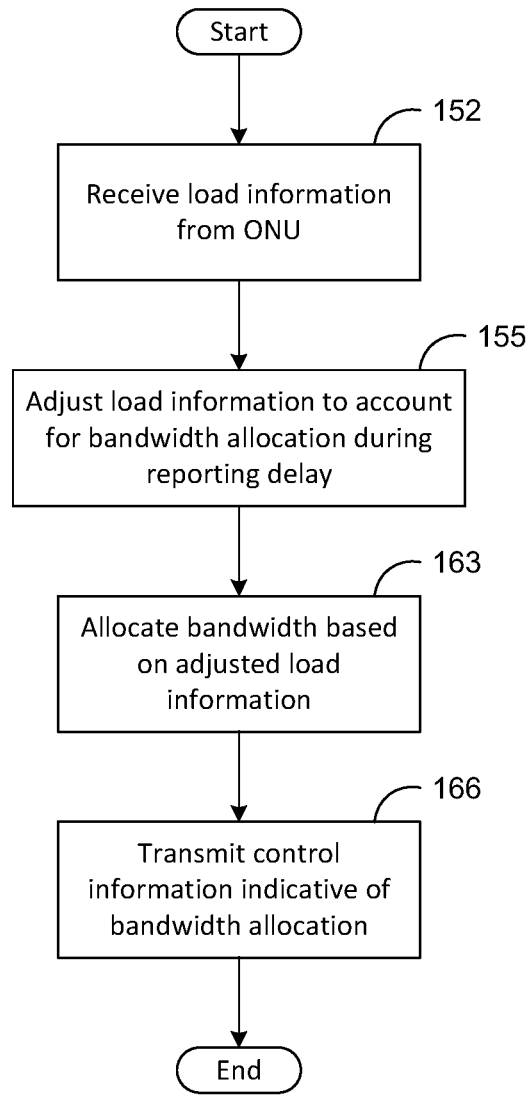
FIG. 4 is a flow chart illustrating an exemplary method of processing upstream load information at an access module, such as is depicted by FIG. 2, for allocating upstream bandwidth.

FIG. 4 depicts an exemplary method of processing load information from an ONU 33 at the access module 52 in accordance with an embodiment of the present disclosure. As shown by block 152, the OLT 30 receives load information from an ONU 33. Such load information indicates the upstream load (e.g., the amount of data queued in a buffer for transmission to the OLT 33) at the ONU 33 at about the time of transmission of the load information from the ONU 33. As noted above, there is a delay ("reporting delay") from the time of transmission of the load information by the ONU 33 until the time that the load information is processed by the DBA controller 101 for allocating upstream bandwidth. Generally, the further that the ONU 33 is from the OLT 30, the longer is this reporting delay.

During such reporting delay, several frames may occur on the PON 39 such that the ONU 33 transmits data in several frames (referred to hereafter as the "Delay Frames") to the OLT 33, thereby reducing the upstream load at the ONU 33. In processing the load information to allocate bandwidth for a frame (n), as shown by block 155 of FIG. 4, the DBA controller 101 is configured to adjust the received load information to account for the amount of bandwidth allocated to the ONU 33 for the Delay Frames that are transmitted from the ONU 33 through the PON 39 during the reporting delay (e.g., while the load information is propagating through the optical channel of the PON 39). As an example, the DBA controller 101 may reduce the load indicated by the load information by an amount corresponding to the total amount of bandwidth allocated to the ONU 33 for the Delay Frames or some fraction or portion thereof.

After adjusting the load information, the load controller 101 then allocates upstream bandwidth based on the adjusted load information, as shown by block 163 of FIG. 4. In this regard, in determining an amount of bandwidth to be allocated to the ONU 33 for frame (n), the DBA controller 101 assumes that the load reported by the ONU 33 is the adjusted load, which has been reduced relative to the load actually reported. Thus, the DBA controller 101 allocates less bandwidth to the ONU 33, thereby conserving bandwidth that may be allocated to the other ONUs 33 of the same PON 39 for the frame (n). Once the bandwidth of the frame (n) has been determined, the DBA controller 101 provides control information (e.g., a bandwidth map) that indicates which upstream timeslots of frame (n) are allocated to which ONU 33 of the PON 39. The OLT 30 then transmits such control information to the ONUs 33 of the PON 39, as shown by block 166 of FIG. 4. Notably, the DBA controller 101 may use similar techniques to adjust the reported load information from the other ONUs 33 of the same PON 39 in order to prevent or reduce the effects of demand overestimation for all or any number of the ONUs 33 as may be desired.

As noted above, the DBA controller 101 can use various known DBA algorithms to allocate bandwidth and can adjust the load information from ONUs 33 in any of various ways in order to eliminate or reduce overestimation of bandwidth demand.

Note that, for illustrative purposes, various embodiments are described above in the context of a PON having an OLT in communication with a plurality of ONUs via an optical channel. However, the techniques described herein for allocating bandwidth may be used for other types of transceivers, such as DSL transceivers, wireless transceivers or other types of non-optical transceivers that communicate via a non-optical channel (e.g., via twisted-wire pairs or wireless).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

Now, therefore, the following is claimed:

1. A time-division multiplexed (TDM) communication system, comprising:
   a first transceiver configured to receive data from a plurality of transceivers via a channel that is time-division multiplexed, the plurality of transceivers including at least a second transceiver and a third transceiver, the first transceiver configured to receive load information from the second transceiver indicating a load buffered by the second transceiver for transmission to the first transceiver; and
   a dynamic bandwidth allocation (DBA) controller configured to allocate bandwidth to the plurality of transceivers, the DBA controller configured to determine an amount of bandwidth allocated to the second transceiver for transmissions from the second transceiver to the first transceiver occurring while the load information is propagating through the channel, the DBA controller configured to adjust the load indicated by the load information based on the determined amount of bandwidth allocated to the second transceiver such that the adjusted load accounts for transmissions by the second transceiver during propagation of the load information through the channel, the DBA controller further configured to allocate bandwidth to the second transceiver for transmissions to the first transceiver based on the adjusted load and to cause the first transceiver to transmit control information indicative of the bandwidth allocated to the second transceiver based on the adjusted load.

2. The system of claim 1, wherein the first transceiver is an optical transceiver of an optical line terminal, and wherein the second transceiver is an optical transceiver of an optical network unit.

3. The system of claim 1, wherein:
   the first transceiver is configured to receive second load information from the third transceiver indicating a load buffered for transmission to the first transceiver;
   the DBA controller is configured to determine an amount of bandwidth allocated to the third transceiver for transmissions to the first transceiver occurring while the second load information is propagating through the channel;
   the DBA controller is configured to adjust the load indicated by the second load information based on the determined amount of bandwidth allocated to the third transceiver;
   the DBA controller is further configured to allocate bandwidth to the third transceiver for transmissions to the first transceiver based on the adjusted load from the second load information; and
   the DBA controller is configured to cause the first transceiver to transmit control information indicative of the bandwidth allocated to the third transceiver based on the adjusted load from the second load information.

4. The system of claim 1, wherein the DBA controller is configured to calculate a value indicating a total amount of bandwidth allocated to the second transceiver for at least one frame communicated through the channel while the load information is propagating through the channel, and wherein the DBA controller is configured to adjust the load indicated by the load information based on the value.

5. The system of claim 4, wherein the DBA controller is configured to apply a predefined scaling factor to the value.

6. A method, comprising:
   receiving, at a first transceiver, data from a plurality of transceivers via a channel that is time-division multiplexed, the plurality of transceivers including at least a second transceiver and a third transceiver;
   receiving, at the first transceiver, load information from the second transceiver indicating a load buffered by the second transceiver for transmission to the first transceiver;
   determining an amount of bandwidth allocated to the second transceiver for transmissions from the second transceiver to the first transceiver occurring while the load information is propagating through the channel;
   adjusting the load indicated by the load information based on the determined amount of bandwidth;
   allocating bandwidth to the second transceiver for transmissions to the first transceiver based on the adjusted load; and
   transmitting, to the second transceiver, control information indicative of the bandwidth allocated to the second transceiver based on the adjusted load.

7. The method of claim 6, wherein the first transceiver is an optical transceiver of an optical line terminal, and wherein the second transceiver is an optical transceiver of an optical network unit.

8. The method of claim 6, further comprising:
receiving, at the first transceiver, second load information from the third transceiver indicating a load buffered for transmission to the first transceiver;
determining an amount of bandwidth allocated to the third transceiver for transmissions to the first transceiver occurring while the second load information is propagating through the channel;
adjusting the load indicated by the second load information based on the determined amount of bandwidth allocated to the third transceiver;
allocating bandwidth to the third transceiver for transmissions to the first transceiver based on the adjusted load from the second load information; and
transmitting, to the third transceiver, control information indicative of the bandwidth allocated to the third transceiver based on the adjusted load from the second load information.

9. The method of claim 6, further comprising calculating a value indicating a total amount of bandwidth allocated to the second transceiver for at least one frame communicated through the channel while the load information is propagating through the channel, wherein the adjusting is based on the value.

10. The method of claim 9, further comprising applying a predefined scaling factor to the value.

11. A method, comprising:
receiving, at a first transceiver, data from a plurality of transceivers via a channel that is time-division multiplexed, the plurality of transceivers including at least a second transceiver and a third transceiver;
receiving, at the first transceiver, load information from the second transceiver indicating a load buffered by the second transceiver for transmission to the first transceiver;
communicating data between the first transceiver and the plurality of transceivers in a plurality of frames, including at least a first frame and a second frame, wherein data of the first frame is transmitted through the channel while the load information is propagating through the channel, and wherein data of the second frame is transmitted by the plurality of transceivers through the channel after the load information is received by the first transceiver;
allocating bandwidth to the second transceiver for the first frame;
transmitting, from the first transceiver to the second transceiver, control information indicative of the bandwidth allocated to the second transceiver for the first frame;
adjusting the load indicated by the load information received by the first transceiver based on the allocating bandwidth to the second transceiver for the first frame;
allocating, based on the adjusted load, bandwidth to the second transceiver for the second frame; and
transmitting, from the first transceiver to the second transceiver, control information indicative of the bandwidth allocated to the second transceiver for the second frame.

12. The method of claim 11, wherein the first transceiver is an optical transceiver of an optical line terminal, and wherein the second transceiver is an optical transceiver of an optical network unit.

13. The method of claim 11, further comprising:
receiving, at the first transceiver, second load information from the third transceiver indicating a load buffered for transmission to the first transceiver;
allocating bandwidth to the third transceiver for the first frame;
transmitting, from the first transceiver to the third transceiver, control information indicative of the bandwidth allocated to the third transceiver for the first frame;
adjusting the load indicated by the second load information based on the allocating bandwidth to the third transceiver for the first frame;
allocating, based on the adjusted load from the second load information, bandwidth to the third transceiver for the second frame; and
transmitting, from the first transceiver to the third transceiver, control information indicative of the bandwidth allocated to the third transceiver for the second frame.

14. The method of claim 13, further comprising applying a predefined scaling factor to the value.

15. The method of claim 11, further comprising calculating a value indicating a total amount of bandwidth allocated to the second transceiver for at least one frame communicated through the channel while the load information is propagating through the channel, wherein the adjusting is based on the value.

16. A time-division multiplexed (TDM) communication system, comprising:
a first transceiver configured to receive data from a plurality of transceivers via a channel that is time-division multiplexed, the plurality of transceivers including at least a second transceiver and a third transceiver, the first transceiver configured to receive load information from the second transceiver indicating a load buffered by the second transceiver for transmission to the first transceiver, the first transceiver further configured to receive data in a plurality of frames, including at least a first frame and a second frame, from each of the plurality of transceivers, wherein data of the first frame is transmitted through the channel while the load information is propagating through the channel, and wherein data of the second frame is transmitted by the plurality of transceivers through the channel after the load information is received by the first transceiver; and
a dynamic bandwidth allocation (DBA) controller configured to allocate bandwidth to the second transceiver for the first frame, wherein the first transceiver is configured to transmit to the second transceiver control information indicative of the bandwidth allocated to the second transceiver for the first frame, the DBA controller configured to adjust the load indicated by the load information received by the first transceiver based on the bandwidth allocated to the second transceiver for the first frame, the DBA controller further configured to allocate, based on the adjusted load, bandwidth to the second transceiver for the second frame, wherein the first transceiver is configured to transmit to the second transceiver control information indicative of the bandwidth allocated to the second transceiver for the second frame.

\* \* \* \* \*